(12) United States Patent
Bartelt et al.

(10) Patent No.: US 8,486,295 B2
(45) Date of Patent: *Jul. 16, 2013

(54) ALKYL PERFLUOROALKENE ETHERS AND USES THEREOF

(75) Inventors: Joan Ellen Bartelt, Wilmington, DE (US); Robert D. Lousenberg, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 101 days.

This patent is subject to a terminal disclaimer.

(21) Appl. No.: 13/170,646

(22) Filed: Jun. 28, 2011

(65) Prior Publication Data

US 2012/0006510 A1 Jan. 12, 2012

Related U.S. Application Data

(60) Provisional application No. 61/362,833, filed on Jul. 9, 2010.

(51) Int. Cl.
*C09K 5/04* (2006.01)
(52) U.S. Cl.
USPC .......................................... 252/67

(58) Field of Classification Search
USPC ............................................ 252/67
See application file for complete search history.

(56) References Cited

U.S. PATENT DOCUMENTS

| 4,560,759 A | 12/1985 | Hiratani |
| 2010/0025619 A1 | 2/2010 | Riva et al. |
| 2010/0209600 A1* | 8/2010 | Bartelt et al. ............. 427/127 |

FOREIGN PATENT DOCUMENTS

| WO | 9937598 A1 | 7/1999 |
| WO | 2010094019 A2 | 8/2010 |

OTHER PUBLICATIONS

Charles, Issabelle, International Search Report, PCT/US2011/043301, Filing Date Jul. 8, 2011.

* cited by examiner

*Primary Examiner* — Josh Hardee

(57) ABSTRACT

Disclosed are methods of transferring heat comprising providing a device, using a heat-transfer fluid to transfer heat to or from the device, wherein the heat-transfer fluid compositions comprise at least one unsaturated fluoroether having the formula $CF_3(CF_2)_xCF=CFCF(OR)(CF_2)_yCF_3$, $CF_3(CF_2)_xC(OR)=CFCF_2(CF_2)_yCF_3$, $CF_3CF=CFCF(OR)(CF_2)_x(CF_2)_yCF_3$, $CF_3(CF_2)_xCF=C(OR)CF_2(CF_2)_yCF_3$, or mixtures thereof, wherein R can be either $CH_3$, $C_2H_5$ or mixtures thereof, and wherein x and y are independently 0, 1, 2 or 3, and wherein x+y=0, 1, 2 or 3.

8 Claims, No Drawings

ALKYL PERFLUOROALKENE ETHERS AND USES THEREOF

CROSS REFERENCE TO RELATED APPLICATIONS

This application claims priority to U.S. Provisional application 61/362,833, filed Jul. 9, 2010.

BACKGROUND INFORMATION

1. Field of the Disclosure

This invention relates to compositions comprising unsaturated fluorocarbon ethers and their use as heat transfer compositions.

2. Description of the Related Art

The present invention provides new compositions comprising unsaturated fluorocarbon ethers, and methods of manufacture of such unsaturated fluorocarbon ethers. These compositions have utility in many of the applications formerly served by CFC compounds. The compositions of the present invention possess some or all of the desired properties of little or no environmental impact, ability to dissolve oils, greases or lubricants (in particular fluorine-containing lubricants), non-flammability, and ability to dissolve surfactant compounds used in methods for drying or dewatering.

Presently various fluids are used for heat transfer. The suitability of the heat-transfer fluid depends upon the application process. For example, some electronic applications require a heat-transfer fluid which is inert, has a high dielectric strength, has low toxicity, good environmental properties, and good heat transfer properties over a wide temperature range. Other applications require precise temperature control and thus the heat-transfer fluid is required to be a single phase over the entire process temperature range and the heat-transfer fluid properties are required to be predictable, i.e., the composition remains relatively constant so that the viscosity, boiling point, etc. can be predicted so that a precise temperature can be maintained and so that the equipment can be appropriately designed.

In the semiconductor industry, there are numerous devices or processes that require a heat-transfer fluid having select properties. The heat-transfer fluid may be used to remove heat, add heat, or maintain a temperature.

Each of the semiconductor processes described below incorporates a device or a work-piece which has heat removed from it or has heat added to it. The heat transfer associated with either the heat removal or addition can take place over a wide temperature range. Thus, in each case a heat-transfer fluid is preferably used which has other attributes that make it "operator friendly". In order for a heat-transfer fluid to be considered "operator friendly", the heat-transfer fluid preferably exhibits low toxicity and low flammability.

For automated test equipment (ATE), equipment is used to test the performance of semiconductor dice. The dice are the individual "chips" that are cut from a wafer of semiconductor substrate. The dice come from the semiconductor foundry and must be checked to ensure they meet functionality requirements and processor speed requirements. The test is used to sort "known good dice" (KGD) from dice that do not meet the performance requirements. This testing is generally performed at temperatures ranging from about −80° C. to about 100° C.

In some cases the dice are tested one-by-one, and an individual die is held in a chuck. This chuck provides, as part of its design, provision for cooling the die. In other cases, several dice are held in the chuck and are tested either sequentially or in parallel. In this situation, the chuck provides cooling for several dice during the test procedure.

It may also be advantageous to test dice at elevated temperatures to determine their performance characteristics under conditions of elevated temperature. In this case, a coolant which has good heat-transfer properties well above room temperature is advantageous.

In some cases, the dice are tested at very low temperatures. For example, Complementary Metal-Oxide Semiconductor ("CMOS") devices in particular operate more quickly at lower temperatures.

If a piece of ATE equipment employs CMOS devices "on board" as part of its permanent logic hardware, it may be advantageous to maintain the logic hardware at a low temperature.

Therefore, to provide maximum versatility to the ATE, a heat-transfer fluid preferably performs well at both low and high temperatures (i.e., preferably has good heat transfer properties over a wide temperature range), is inert (i.e., is non-flammable, low in toxicity, non-chemically reactive), has high dielectric strength, has a low environmental impact, and has predictable heat-transfer properties over the entire operating temperature range.

Heat-transfer fluids which are presently used in these semiconductor applications include perfluorocarbons (PFCs), perfluoropolyethers (PFPEs), perfluoroamines (PFAs), perfluoroethers (PFEs), water/glycol mixtures, deionized water, silicone oils and hydrocarbon oils. However, each of these heat-transfer fluids has some disadvantage. PFCs, PFPEs, PFAs and PFEs may exhibit atmospheric lifetime values of greater than 500 years, and up to 5,000 years. Additionally, these materials may exhibit high global warming potentials ("GWP"). GWP is the integrated potential warming due to the release of one (1) kilogram of sample compound relative to the warming due to one (1) kilogram of $CO_2$ over a specified integration time horizon. Water/glycol mixtures are temperature limited, that is, a typical low temperature limit of such mixtures is −40° C. At low temperatures water/glycol mixtures also exhibit relatively high viscosity. The high viscosity at low temperature yields high pumping power. Deionized water has a low temperature limit of 0° C. Silicone oils and hydrocarbon oils are typically flammable.

Removing heat from electronic devices has become one of the most important obstacles to further improving processor performance. As these devices become more powerful, the amount of heat generated per unit time increases. Therefore, the mechanism of heat transfer plays an important role in processor performance. The heat-transfer fluid preferably has good heat transfer performance, good electrical compatibility (even if used in "indirect contact" applications such as those employing cold plates), as well as low toxicity, low (or non-) flammability and low environmental impact. Good electrical compatibility requires the heat-transfer fluid candidate to exhibit high dielectric strength, high volume resistivity, and poor solvency for polar materials. Additionally, the heat-transfer fluid candidate must exhibit good mechanical compatibility, that is, it must not affect typical materials of construction in an adverse manner. In this application, heat-transfer fluid candidates are disqualified if their physical properties are not stable over time.

Materials currently used as heat-transfer fluids for cooling electronics or electrical equipment include PFCs, PFPEs, silicone oils, and hydrocarbon oils. Each of these heat-transfer fluids has some disadvantage. PFCs and PFPEs may be environmentally persistent. Silicone oils and hydrocarbon oils are typically flammable.

Thermal shock testing is generally performed at temperatures ranging from about −65° C. to about 150° C. The rapid cycling of temperature in a part or device may be required to simulate the thermal changes brought on by, for instance, launching a missile. Thermal shock testing is required for electronics used for military missiles, among other things. There are several military specifications related to thermal shock testing of many electronic components and assemblies. This test uses various means of imparting rapidly changing temperatures within a part or electronic device. One such device employs a liquid heat-transfer fluid or liquid heat-transfer fluids that are kept in separate reservoirs maintained at temperature extremes where parts are alternately immersed to induce thermal shock to the test part. Typically, operators load and unload the components or assemblies to and from the thermal shock equipment. Therefore, it is important that a heat-transfer fluid used in such an application exhibit low toxicity, low flammability, and low environmental impact. Heat-transfer fluids which are liquid over a wide temperature range coupled with low toxicity, low flammability, and low environmental impact are ideal for thermal shock testing.

Materials currently used as heat-transfer fluids for liquid/liquid thermal shock test baths include liquid nitrogen, PFCs, and PFPEs. Each of these heat-transfer fluids has some disadvantage. Liquid nitrogen systems offer limited temperature selectivity at the low temperature end. PFCs and PFPEs may be environmentally persistent.

Constant temperature baths are typically operated over a broad temperature range. Therefore, desirable heat-transfer fluids preferably have a wide liquid range and good low-temperature heat transfer characteristics. A heat-transfer fluid having such properties allows a very wide operating range for the constant temperature bath. Typically, most testing fluids require fluid change-out for wide temperature extremes. Also, good temperature control is essential for accurately predicting physical properties of the heat-transfer fluids.

Heat-transfer fluids which are presently used in this application include: perfluorocarbons (PFCs), perfluoropolyethers (PFPEs), water/glycol mixtures, deionized water, silicone oils, hydrocarbon oils, and hydrocarbon alcohols. Each of these heat-transfer fluids has some disadvantage. PFCs and PFPEs may be environmentally persistent. Water/glycol mixtures are temperature limited, that is, a typical low temperature limit of such mixtures is −40° C. At low temperatures water/glycol mixtures also exhibit relatively high viscosity. Deionized water has a low temperature limit of 0° C. Silicone oils, hydrocarbon oils and hydrocarbon alcohols are typically flammable.

For heat-transfer processing requiring an inert fluid, fluorinated materials are often used. Fluorinated materials typically have low toxicity, are essentially non-irritating to the skin, are non-chemically reactive, are non-flammable, and have high dielectric strength. Fluorinated materials such as perfluorocarbons, perfluoropolyethers, and hydrofluoroethers provide the additional advantage of not depleting the ozone layer in the stratosphere.

As discussed above, perfluorocarbons, perfluoropolyethers, and some hydrofluoroethers have been used for heat-transfer.

Perfluorocarbons (PFCs) exhibit several traits advantageous to the applications discussed above. PFCs have high dielectric strength and high volume resistivity. PFCs are non-flammable and are generally mechanically compatible with materials of construction, exhibiting limited solvency. Additionally, PFCs generally exhibit low toxicity and good operator friendliness. PFCs are manufactured in such a way as to yield a product that has a narrow molecular weight distribution. They do exhibit one important disadvantage, however, and that is long environmental persistence.

Perfluoropolyethers (PFPEs) exhibit many of the same advantageous attributes described for PFCs. They also have the same major disadvantage, i.e., long environmental persistence. In addition, the methods developed for manufacturing these materials yield products that are not of consistent molecular weight and thus are subject to performance variability.

Hydrofluoropolyethers (HFPEs), a class of hydrofluoroethers (HFEs), exhibit some of the same advantageous attributes of PFCs, but differ greatly in two areas. To their credit, they exhibit markedly lower environmental persistence, yielding atmospheric lifetimes on the order of decades rather than millennia. However, some of the HFPEs taught as heat-transfer fluids are a mixture of components of widely disparate molecular weight. Thus, their physical properties may change over time which makes it difficult to predict performance.

Some hydrofluoroethers have been disclosed as heat-transfer fluids. However, the need exists for a heat-transfer fluid which is inert, has high dielectric strength, low electrical conductivity, chemical inertness, thermal stability and effective heat transfer, is liquid over a wide temperature range, has good heat-transfer properties over a wide range of temperatures and also has a shorter atmospheric lifetime, and therefore a lower global warming potential, than existing heat-transfer fluids.

SUMMARY

In one embodiment, disclosed herein are novel methods of using a composition comprising at least one unsaturated fluoroether having the formula $CF_3(CF_2)_xCF=CFCF(OR)(CF_2)_yCF_3$, $CF_3(CF_2)_xC(OR)=CFCF_2(CF_2)_yCF_3$, $CF_3CF=CFCF(OR)(CF_2)_x(CF_2)_yCF_3$, $CF_3(CF_2)_xCF=C(OR)CF_2(CF_2)_yCF_3$, or mixtures thereof, wherein R can be either $CH_3$, $C_2H_5$ or mixtures thereof, and wherein x and y are independently 0, 1, 2 or 3, and wherein x+y=0, 1, 2 or 3 for transferring heat. In one embodiment, described are methods of providing a device, providing a mechanism for transferring heat comprising a heat transfer fluid, and using the heat transfer fluid to transfer heat to or from the device.

The foregoing general description and the following detailed description are exemplary and explanatory only and are not restrictive of the invention, as defined in the appended claims.

DETAILED DESCRIPTION

In one embodiment, disclosed herein are novel methods of using a composition comprising at least one unsaturated fluoroether having the formula $CF_3(CF_2)_xCF=CFCF(OR)(CF_2)_yCF_3$, $CF_3(CF_2)_xC(OR)=CFCF_2(CF_2)_yCF_3$, $CF_3CF=CFCF(OR)(CF_2)_x(CF_2)_yCF_3$, $CF_3(CF_2)_xCF=C(OR)CF_2(CF_2)_yCF_3$, or mixtures thereof, wherein R can be either $CH_3$, $C_2H_5$ or mixtures thereof, and wherein x and y are independently 0, 1, 2 or 3, and wherein x+y=0, 1, 2 or 3 as heat transfer compositions, and mechanisms and devices for transferring heat comprising the above heat transfer compositions. The unsaturated fluoroether compounds are inert, non-flammable, and environmentally acceptable. The unsaturated fluoroether compounds exhibit a low viscosity through the liquid range, and have good heat transfer properties over a wide temperature range.

Many aspects and embodiments have been described above and are merely exemplary and not limiting. After reading this specification, skilled artisans appreciate that other aspects and embodiments are possible without departing from the scope of the invention. Other features and benefits of any one or more of the embodiments will be apparent from the following detailed description, and from the claims.

Before addressing details of embodiments described below, some terms are defined or clarified.

The unsaturated fluoroether compositions described herein are generally inert. Additionally, the compositions described herein have high dielectric strength and low electrical conductivity. The compositions additionally are thermally stable.

In one embodiment, unsaturated fluoroethers of the invention represent compounds having at least one unsaturated fluoroether having the formula $CF_3(CF_2)_xCF=CFCF(OR)(CF_2)_yCF_3$, $CF_3(CF_2)_xC(OR)=CFCF_2(CF_2)_yCF_3$, $CF_3CF=CFCF(OR)(CF_2)_x(CF_2)_yCF_3$, $CF_3(CF_2)_xCF=C(OR)CF_2(CF_2)_yCF_3$, or mixtures thereof, wherein R can be either $CH_3$, $C_2H_5$ or mixtures thereof, and wherein x and y are independently 0, 1, 2 or 3, and wherein x+y=0, 1, 2 or 3.

Apparatus

In certain embodiments, the invention includes an apparatus requiring heat transfer. The apparatus comprises a device and a mechanism for transferring heat to or from the device using a heat-transfer fluid. Such apparatus include refrigeration systems, cooling systems, testing equipment, and machining equipment.

Examples of an apparatus of the present invention include, but are not limited to, test heads used in automated test equipment for testing the performance of semiconductor dice; wafer chucks used to hold silicon wafers in ashers, steppers, etchers, PECVD tools; constant temperature baths, and thermal shock test baths.

Device

In certain embodiments, the present invention comprises a device. The device is defined herein as a component, workpiece, assembly, etc. to be cooled, heated or maintained at a selected temperature. Such devices include electrical components, mechanical components and optical components. Examples of devices of the present invention include, but are not limited to microprocessors, wafers used to manufacture semiconductor devices, power control semiconductors, electrical distribution switch gear, power transformers, circuit boards, multi-chip modules, packaged and unpackaged semiconductor devices, chemical reactors, nuclear reactors, fuel cells, lasers, and missile components.

Heat Transfer Mechanism

In certain embodiments, the present invention comprises a mechanism for transferring heat. Heat is transferred by placing the heat transfer mechanism in thermal contact with the device. The heat transfer mechanism, when placed in thermal contact with the device, removes heat from the device or provides heat to the device, or maintains the device at a selected temperature. The direction of heat flow (from device or to device) is determined by the relative temperature difference between the device and the heat transfer mechanism.

The heat transfer mechanism comprises the heat-transfer fluid of the present invention.

Additionally, the heat transfer mechanism may include facilities for managing the heat-transfer fluid, including, but not limited to: pumps, valves, fluid containment systems, pressure control systems, condensers, heat exchangers, heat sources, heat sinks, refrigeration systems, active temperature control systems, and passive temperature control systems. In some embodiments, the heat sink comprises a vapor compression chiller system.

Examples of suitable heat transfer mechanisms include, but are not limited to, temperature controlled wafer chucks in PECVD tools, temperature controlled test heads for die performance testing, temperature controlled work zones within semiconductor process equipment, thermal shock test bath liquid reservoirs, and constant temperature baths.

In some systems, such as etchers, ashers, PECVD chambers, thermal shock testers, the upper desired operating temperature may be as high as 150° C.

Method

The present invention additionally comprises a method for transferring heat comprising the steps of: providing a device, providing a mechanism for transferring heat comprising a heat-transfer fluid, and using the heat-transfer fluid to transfer heat to or from the device, wherein the heat-transfer fluid comprises at least one unsaturated fluoroether having the formula $CF_3(CF_2)_xCF=CFCF(OR)(CF_2)_yCF_3$, $CF_3(CF_2)_xC(OR)=CFCF_2(CF_2)_yCF_3$, $CF_3CF=CFCF(OR)(CF_2)_x(CF_2)_yCF_3$, $CF_3(CF_2)_xCF=C(OR)CF_2(CF_2)_yCF_3$, or mixtures thereof, wherein R can be either $CH_3$, $C_2H_5$ or mixtures thereof, and wherein x and y are independently 0, 1, 2 or 3, and wherein x+y=0, 1, 2 or 3.

In one embodiment, the compositions disclosed herein may be prepared by contacting a perfluoroalkene, such as perfluoro-3-heptene, pefluoro-2-heptene, perfluoro-2-hexene, perfluoro-3-hexene, or perfluoro-2-pentene with an alcohol in the presence of a strong base. For example, perfluoro-3-heptene may be reacted with an alcohol such as methanol or ethanol, or mixtures thereof, in the presence of an aqueous solution of a strong base to produce unsaturated fluoroethers. Herein after alcohol or "an alcohol" shall be regarded as referring to alcohols such as methanol or ethanol, and to mixtures thereof.

In one embodiment, the products from the reaction of perfluoro-3-heptene with methanol comprise 5-methoxyperfluoro-3-heptene, 3-methoxyperfluoro-3-heptene, 4-methoxyperfluoro-2-heptene and 3-methoxyperfluoro-2-heptene.

In one embodiment, the products from the reaction of perfluoro-2-pentene with methanol comprise 4-methoxyperfluoro-2-pentene, 2-methoxyperfluoro-2-pentene, 3-methoxyperfluoro-2-pentene, and 2-methoxyperfluoro-3-pentene.

In one embodiment, the products from the reaction of perfluoro-2-octene with methanol comprise cis- and trans-2-methoxyperfluoro-2-octene and 2-methoxyperfluoro-3-octene.

In one embodiment, the strong base is a base which will react with an alcohol to produce an alkoxide upon combination of the base with said alcohol. Bases which can be used to form such alkoxides include alkali metal hydroxides, such as sodium hydroxide or potassium hydroxide without limitation.

In one embodiment, the strong base is present in the form of an aqueous solution having a concentration of alkali metal hydroxide of from 10% by weight to 45% by weight. In one embodiment, one mole of alkali metal hydroxide is used per mole of alcohol to produce the alkoxide. In another embodiment, 1.1 moles of alkali metal hydroxide per mole of alcohol is used. In yet another embodiment about 0.9 moles of alkali metal hydroxide per mole of alcohol is used.

In one embodiment, one mole of alkali metal hydroxide is used per mole of perfluoroalkene. In another embodiment, about 1.1 moles of alkali metal hydroxide are used per mole of perfluoroalkene. In yet another embodiment, about 1.05 moles of alkali metal hydroxide are used per mole of perfluoroalkene.

In one embodiment, the alkali metal hydroxide is combined with the pefluoroalkene, and then an alcohol and water are added to the mixture of perfluoroalkene and base, resulting in an immediate exothermic reaction. In another embodiment, the alkali metal hydroxide is dissolved in water and mixed with the perfluoroalkene. Addition of the alcohol results in an immediate exothermic reaction to produce the unsaturated fluoroethers.

In one embodiment, the alcohol is added to the perfluoroalkene, alkali metal hydroxide and water in one portion. In another embodiment, the alcohol is added slowly over a period of time. In one embodiment, the alcohol is added over one hour. In another embodiment, the alcohol is added over two hours. In yet another embodiment, the perfluoroalkene, alkali metal hydroxide and alcohol are added together, and the water is added slowly over time.

In one embodiment, the perfluoroalkene, alkali metal hydroxide, alcohol and water are all added at about room temperature. In another embodiment, the perfluoroalkene and aqueous solution of alkali metal hydroxide are heated to about 50° C., and the alcohol is added slowly over a period of time.

In one embodiment, a phase transfer catalyst is added to the mixture of perfluoroalkene, alkali metal hydroxide, alcohol and water. In one embodiment a phase transfer catalyst is a quaternary ammonium salt. In one embodiment, a phase transfer catalyst is Aliquat 336. In one embodiment, the amount of phase transfer catalyst is from about 1% by weight to about 10% by weight of the alkali metal hydroxide.

The phase transfer catalyst can be ionic or neutral and is selected from the group consisting of crown ethers, onium salts, cryptates and polyalkylene glycols and derivatives thereof, and mixtures thereof. An effective amount of the phase transfer catalyst should be used in order to effect the desired reaction; such an amount can be determined by limited experimentation once the reactants, process conditions and phase transfer catalyst are selected.

Crown ethers are cyclic molecules in which ether groups are connected by dimethylene linkages; the compounds form a molecular structure that is believed to be capable of "receiving" or holding the alkali metal ion of the hydroxide and to thereby facilitate the reaction. Particularly useful crown ethers include 18-crown-6, especially in combination with potassium hydroxide; 15-crown-5, especially in combination with sodium hydroxide; 12-crown-4, especially in combination with lithium hydroxide. Derivatives of the above crown ethers are also useful, e.g., dibenzo-18-crown-6, dicyclohexano-18-crown-6, and dibenzo-24-crown-8 as well as 12-crown-4. Other polyethers particularly useful for alkali metal compounds, and especially for lithium, are described in U.S. Pat. No. 4,560,759 which is incorporated herein by reference to the extent permitted. Other compounds analogous to the crown ethers and useful for the same purpose are compounds which differ by the replacement of one or more of the oxygen atoms by other kinds of donor atoms, particularly N or S, such as hexamethyl-[14]-4,11-dieneN$_4$.

Onium salts include quaternary phosphonium salts and quaternary ammonium salts that may be used as the phase transfer catalyst in the process of the present invention; such compounds can be represented by the following formulas I and II:

$$R^1R^2R^3R^4P^{(+)}X'^{(-)} \quad (I)$$

$$R^1R^2R^3R^4N^{(+)}X'^{(-)} \quad (II)$$

wherein each of $R_1$, $R_2$, $R_3$ and $R_4$, which may be the same or different, is an alkyl group, an aryl group or an aralkyl group, and X' is a halogen atom. Specific examples of these compounds include tetramethylammonium chloride, tetramethylammonium bromide, benzyltriethylammonium chloride, methyltrioctylammonium chloride (available commercially under the brands Aliquat 336 and Adogen 464), tetra-n-butylammonium chloride, tetra-n-butylammonium bromide, tetra-n-butylammonium hydrogen sulfate, tetra-n-butylphosphonium chloride, tetraphenylphosphonium bromide, tetraphenylphosphonium chloride, triphenylmethylphosphonium bromide and triphenylmethylphosphonium chloride. Among them, benzyltriethylammonium chloride is preferred for use under strongly basic conditions. Other useful compounds within this class of compounds include those exhibiting high temperature stabilities (e.g., up to about 200.degree. C.) and including 4-dialkylaminopyridinium salts such as tetraphenylarsonium chloride, bis[tris(dimethylamino)phosphine]iminium chloride and tetratris[tris(dimethylamino)phosphinimino]phosphonium chloride; the latter two compounds are also reported to be stable in the presence of hot, concentrated sodium hydroxide and, therefore, can be particularly useful.

Polyalkylene glycol compounds useful as phase transfer catalysts can be represented by the formula:

$$R^6O(R^5O)_tR^7 \quad (III)$$

wherein $R_5$ is an alkylene group, each of $R_6$ and $R_7$, which may be the same or different, is a hydrogen atom, an alkyl group, an aryl group or, an aralkyl group, and t is an integer of at least 2. Such compounds include, for example glycols such as diethylene glycol, triethylenre glycol, tetraethylene glycol, pentaethylene glycol, hexaethylene glycol, diisopropylene glycol, dipropylene glycol, tripropylene glycol, tetrapropylene glycol and tetramethylene glycol, and monoalkyl ethers such as monomethyl, monoethyl, monopropyl and monobutyl ethers of such glycols, dialkyl ethers such as tetraethylene glycol dimethyl ether and pentaethylene glycol dimethyl ether, phenyl ethers, benzyl ethers, and polyalkylene glycols such as polyethylene glycol (average molecular weight about 300) dimethyl ether, polyethylene glycol (average molecular weight about 300) dibutyl ether, and polyethylene glycol (average molecular weight about 400) dimethyl ether. Among them, compounds wherein both $R_6$ and $R_7$ are alkyl groups, aryl groups or aralkyl groups are preferred.

Cryptates are another class of compounds useful in the present as phase transfer catalysts. These are three-dimensional polymacrocyclic chelating agents that are formed by joining bridgehead structures with chains that contain properly spaced donor atoms. For example, bicyclic molecules that result from joining nitrogen bridgeheads with chains of (—OCH$_2$CH$_2$—) groups as in 2.2.2-cryptate (4,7,13,16,21, 24-hexaoxa-1,10-diasabicyclo-(8.8.8)hexacosane; available under the brand names cryptand 222 and Kryptofix 222). The donor atoms of the bridges may all be O, N, or S, or the compounds may be mixed donor macrocycles in which the bridge strands contain combinations of such donor atoms.

Combinations of phase transfer catalysts from within one of the groups described above may also be useful as well as combinations or mixtures from more than one group, for example, crown ethers and oniums, or from more than two of the groups, e.g., quaternary phosphonium salts and quaternary ammonium salts, and crown ethers and polyalkylene glycols.

In one embodiment, after several hours the reaction mixture is allowed to cool to ambient temperature and poured into a separatory funnel. The lower organic layer is separated from an aqueous layer containing inorganic salts. The organic layer was then dried, and then could be further purified by distillation. In one embodiment, the organic layer is dried over anhydrous magnesium sulfate. In another embodiment, the organic layer is dried over anhydrous sodium sulfate. In one embodiment of a preparation of perfluoroheptene ethers, a fraction is collected from the distillation predominantly between 108° C. and 122° C., depending on whether the methyl or ethyl ethers were prepared, comprising a mixture of allylic and vinylic perfluoroalkene alkyl ethers.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Group numbers corresponding to columns within the Periodic Table of the elements use the "New Notation" convention as seen in the *CRC Handbook of Chemistry and Physics*, 81$^{st}$ Edition (2000-2001).

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

EXAMPLES

The concepts described herein will be further described in the following examples, which do not limit the scope of the invention described in the claims.

Example 1

Example 1 Demonstrates the Reaction of Methanol with perfluorohept-3-ene

A 250-mL, 3-neck RB flask was set up with overhead mechanical stirring, reflux condenser, heating mantle, and Claisen with thermocouple well and 50-mL addition funnel. 200 g (125 mL, ~0.57 moles) of perfluorohept-3-ene and 37.7 g (0.67-moles) of powdered KOH were added to the flask. 18.3 g (0.57-moles) of methanol was slowly added with the addition funnel. There was a small exothermic reaction. After stirring for 30-minutes, a small amount of water (~20-mL) was added through the condenser and there was a significant exothermic reaction that increased the temperature to between 60 and 70° C.

After stirring for 2-hours, the reaction mixture was flash distilled under vacuum (100-mmHg) into a dry ice cooled flask. The crude distillate was further separated from water in a 250-mL seperatory funnel and dried over magnesium sulfate. Spinning band distillation resulted in a ~60-mL forerun that boiled predominantly between 54 and 74° C. A second product fraction (~40-mL) was collected starting at 95° C. but boiled predominantly between 108 and 114° C. The second fraction was analyzed by GC-MS and mostly comprised a mixture of alylic and vinylic methyl perfluoroheptene ethers. Saturated methyl monohydrofluoroheptane ether products at about 14% were also part of the mixture. Residual perfluorohept-3-ene comprised about 1% of the distilled mixture.

Example 2

Example 2 Demonstrates the Reaction of Methanol with perfluorohept-3-ene

A second reaction of methanol with perfluorohept-3-ene was done in essentially the same manner as in Example 1. 200-g (125 mL, ~0.57 moles) of perfluorohept-3-ene, 35.3-g (0.63-moles) of powdered KOH, 20-mL of water, and approximately ~1-g of Aliquat® 336 were added to the flask. There was an immediate and substantial exothermic reaction with addition of methanol that increased the temperature to between 60 and 70° C. After addition, stirring and heating to between 60 and 70° C. were continued for 2 hours. After cooling to near ambient temperature, the reaction mixture was poured into a seperatory funnel. There was a significant amount of precipitated salts remaining in the upper aqueous layer. The bottom layer (~120-mL) was isolated and dried over magnesium sulfate.

Example 3

Reaction of methanol with perfluorohept-3-ene

A third reaction of methanol with perfluorohept-3-ene was done in essentially the same manner as in Example 1. 200-g (125 mL, ~0.57 moles) of perfluorohept-3-ene, 78.3-g (0.63 moles) of 45% aqueous KOH, and 1-g of Aliquat® 336 were added to a 500-mL flask. There was an immediate and substantial exothermic reaction with addition of methanol that increased the temperature to between 60 and 70° C. After addition, stirring and heating to between 60 and 70° C. were continued for 2 hours. After cooling to near ambient temperature, the reaction mixture was poured into a seperatory funnel. There were no precipitated salts remaining in the aqueous layer. The bottom layer (~120-mL) was isolated and dried over magnesium sulfate.

Example 4

Distillation of methyl perfluoroheptene ethers

The crude methyl perfluoroheptene ether products from Examples 2 and 3 were combined, filtered, and distilled by spinning band. An 18-mL first fraction was collected between 54 and 74° C. An intermediate 4-mL fraction was collected between 74° C. and 106° C. A main 180-mL fraction starting at 106° C. that distilled predominantly between 108° C. and 114° C. was collected. A 35-mL still pot fraction remained that was later identified by GC-MS as consisting mainly of higher methanol addition products. Less than 0.1% perfluoroheptene remained in the main fraction. A 25-mL sample was re-distilled by simple distillation. The observed vapor temperature range was 107 to 112° C. The observed still pot temperature range was 110 to 112° C. The viscosity was 2.72 centistokes at −31° C. as measured using a Cannon-Fenske viscometer.

Example 5

Reaction of methanol with perfluoropent-2-ene

A 1-L, 3-neck RB flask was set up with overhead mechanical stirring, water-ice reflux condenser, heating mantle, and Claisen with thermocouple well and 125-mL addition funnel. 382-g (~240 mL, ~1.53 moles) of perfluoropent-2-ene and 219-g (1.76 moles) of aqueous 45% KOH, and ~1-g of Aliquat® 336 were added to the flask. 53.8-g (1.68-moles) of methanol was slowly added with the addition funnel. There was an exothermic reaction that caused the reaction mixture to reflux. The reaction temperature gradually increased from about 24° C. to 60° C. over the course of the methanol addition. After addition, stirring was continued for 2 hours. After cooling to near ambient temperature, the reaction mixture was poured into a seperatory funnel and the two layers slowly separated over 0.5 h. The bottom layer (~240-mL) was isolated and dried over magnesium sulfate.

Example 6

Distillation of methyl perfluoropentene ethers

The crude methyl perfluoropentene ether product from Example 5 was filtered and distilled by spinning band. An 6-mL first fraction was collected between 50 and 69° C. A main 190-mL fraction starting at 69° C. that distilled predominantly between 71 and 78° C. was collected. A 38-mL still pot fraction remained that was later identified by GC-MS as consisting of a small amount of saturated methyl monohydrofluoropentane ethers and higher methanol addition products. The main fraction was analyzed by GC-MS and mostly comprised a mixture of alylic and vinylic methyl perfluoropentene ethers. Saturated methyl monohydrofluoropentane ether products at about 8.4% were also part of the mixture. Residual perfluoropent-2-ene comprised about 0.03% of the distilled mixture.

A 25-mL sample was re-distilled by simple distillation. The observed vapor temperature range was 72 to 77° C. The observed still pot temperature range was between 73 and 77° C. The viscosity was 0.97 centistokes at −31° C. as measured using a Cannon-Fenske viscometer. Some selected physical properties of the methyl perfluoropentene and perfluoroheptene ethers are listed in Table 1.

TABLE 1

| Ether | Viscosity (cSt) (25° C.) | Specific heat (J/kg-C.) | Density (kg/m$^3$) | Thermal conductivity (W/m-C.) |
| --- | --- | --- | --- | --- |
| MPPE | 0.37 | | 1480 | |
| MPHE | 0.74 | 1021 | 1593 | 0.075 |

Example 7

Reaction ethanol with perfluorohept-3-ene

A 250-mL, 3-neck RB flask was set up with overhead mechanical stirring, reflux condenser, heating mantle, and Claisen with thermocouple well and 50-mL addition funnel. 40-g (0.32-moles) of aqueous KOH and 100-g (0.29 moles) of perfluorohept-3-ene was added to the flask. The mixture was heated with stirring up to 50° C. At that temperature, 16.4-g (0.36 moles) of ethanol, were slowly added to the flask from the addition funnel. An exothermic reaction occurred that caused the reaction mixture to increase in temperature to ~70° C. After the ethanol addition, the reaction mixture was further heated for one hour to maintain the temperature at or near 70° C. Heating was stopped after 1 hour and the reaction was then allowed to cool to near ambient temperature with stirring.

The reaction mixture was poured into a seperatory funnel. The bottom layer (~120-mL) was isolated and dried over magnesium sulfate.

Example 8

Distillation of ethyl perfluoroheptene ethers

The crude ethyl perfluoroheptene ether product from Example 7 was filtered and distilled by spinning band. A 7.5-g first fraction was collected between ~70 and 72° C. A main 73.5-g fraction starting at 110° C. that distilled predominantly between 120° C. and 122° C. was collected. A 5.2-g still pot fraction remained. GC-MS analysis of the main fraction indicated that it consisted of ~62.8% alylic ethyl perfluoroheptene ethers, ~29.7% vinylic ethyl perfluoroheptene ethers, 7.2% ethyl monohydroperfluoroheptane ethers, and 0.3% perfluorohept-3-ene.

Example 9

Reaction of ethanol with perfluorohept-3-ene

A second reaction of ethanol with perfluorohept-3-ene was done in essentially the same manner as in Example 7 except that 26.3-g (0.57 moles) of ethanol was used and the reaction was not heated prior to addition of ethanol. There was an immediate and substantial exothermic reaction with addition of methanol that increased the temperature to between 60 and 70° C. After addition, stirring and heating to between 60 and 70° C. were continued for 2 hours. After cooling to near ambient temperature, the reaction mixture was poured into a seperatory funnel. The bottom layer was isolated and dried over magnesium sulfate.

Example 10

Distillation of ethyl perfluoroheptene ethers

The crude ethyl perfluoroheptene ether product from Example 9 and the distilled product from Example 8 were combined, filtered, and distilled by spinning band. A main fraction starting at 118° C. up to 123° C. was collected. GC-MS analysis of indicated that it consisted of 60.0% alylic ethyl perfluoroheptene ethers, 33.1% vinylic ethyl perfluoroheptene ethers, 6.4% ethyl monohydroperfluoroheptane ethers, 0.4% unknowns, and 0.05% perfluorohept-3-ene.

Example 11

Reaction of methanol with perfluorooct-2-ene

A 250 mL, 3-neck RB flask was set up with overhead mechanical stirring, reflux condenser, heating mantle, a Claisen adaptor with thermocouple well, and a PFA fluoropolymer flexible needle that was connected to a 25 cc glass syringe and syringe pump. 64.6 g (162 mmol) of perfluorooct-2-ene, 5.18 g (162 mmol) of methanol, and 0.5 g of Aliquat® 336 were added to the flask. With 400 rpm stirring, a 45% aqueous KOH solution (20.15 g, 162 mmol) was slowly added with the syringe pump at 0.5 mL/min. The reaction was exothermic and the reaction temperature climbed to about 50° C. After the KOH addition was complete, external heating was applied for 2 hours to heat, and maintain, the contents at about 85° C. The reaction was then cooled to near ambient temperature and the crude product (bottom layer, 64.7 g) was separated in a 50 mL funnel. Gas chromatography with mass spectrum detection (GC/MS) of the crude product indicated that the composition was 6.3% perfluorooct-2-ene, 92.3% unsaturated and saturated ethers, and 1.4% higher methanol adducts.

Example 12

Distillation of methyl perfluorooctene ethers

The crude product from Example 11 was dried over magnesium sulfate and filtered using polypropylene filter cloth into a 250-mL still pot. The crude product was distilled using a small spinning band column with a manual valve control. A ~5 mL first fraction was collected between 85° C. and 115° C., followed by a main fraction (48.7 g) starting at 115° C. but quickly rising to 130° C. and boiling predominantly between 133° C. and 135° C. The GC/MS suggested that the main fraction was a 98.2% mixture of primarily unsaturated ethers with some saturated ethers. 1.8% was perfluorooct-2-ene. $^1$H NMR indicated that the saturated ether content was 4.0%. $^{19}$F NMR indicated that the unsaturated ethers were mostly, trans-2-methoxy-perfluorooct-2-ene (44.8%), 2-methoxy-perfluorooct-3-ene (34.5%), and cis-2-methoxy-perfluorooct-2-ene (5.9%).

Example 13

Use of MPHE as Heat Transfer Fluid

The heat transfer characteristics of MPHE were demonstrated by utilizing a Risshi CS1500-UL-2K chiller. The fluid was placed in the chiller and temperatures of −50° C., −30° C. and 20° C. were tested. After 30 minutes of equilibration at each setpoint, temperatures of the refrigerant and heat transfer fluid were recorded, as shown in Table 2. Additionally, data for Galden® HT-110, a commercially available heat transfer fluid was obtained. Both heat transfer fluids have the same boiling point.

TABLE 2

| | Refrigerant | | Heat transfer fluid | | | Pump |
|---|---|---|---|---|---|---|
| | inlet ° C. | outlet ° C. | outlet ° C. | inlet ° C. | ΔT$_1$ ° C. | Power W/hr |
| Set point = −50° C. | | | | | | |
| MPHE | −64 | −53 | −50 | −44 | 3 | 210 |
| HT-110 | −63 | −56 | −48 | −44 | 8 | 220 |
| Set point = −30° C. | | | | | | |
| MPHE | −62 | −30 | −30 | −26 | 0 | 193 |
| HT-110 | −62 | −30 | −30 | −26 | 0 | 209 |
| Set point = 20° C. | | | | | | |
| MPHE | −60 | 16 | 18 | 20 | 2 | 194 |
| HT-110 | −60 | 16 | 18 | 20 | 2 | 200 |

ΔT$_1$ is the temperature difference between the refrigerant outlet and the heat transfer fluid outlet, an important indication of ability to transfer heat effectively from the refrigerant to the heat transfer fluid. A smaller temperature gap is preferred. It was demonstrated that MPHE performed as well or better than the commercially available fluid.
Pump power recorded demonstrates the MPHE fluid consumes less power than HT-110, making the MPHE more energy efficient to circulate the fluid.

Example 14

Viscosity

The viscosity of a heat transfer fluid is important, especially at colder temperatures where a viscous fluid becomes more costly to circulate. The viscosity of MPHE was measured between −30° C. and +30° C. The MPHE viscosity was measured using the Cannon-Fiske viscometer #25 for temperatures above 20° C. and #50 for temperatures at 20° C. and below. A model was developed to obtain viscosity information outside the measured range. Data is shown in Table 3, which also shows a comparison with the commercially available heat transfer fluid HT-110. Viscosities for HT-110 were obtained from the manufacturer's technical bulletin.

TABLE 3

| Temperature ° C. | MPHE viscosity cp | HT-110 viscosity cp |
|---|---|---|
| −50 | 8.7 | 10.3 |
| −40 | 6.1 | 7.0 |
| −30 | 4.5 | 4.8 |
| −20 | 3.3 | 3.6 |
| −10 | 2.5 | 2.8 |
| 0 | 2.0 | 2.2 |
| 10 | 1.6 | 1.7 |
| 20 | 1.3 | 1.4 |
| 30 | 1.0 | 1.2 |

Viscosity data demonstrates that MPHE has a lower viscosity than HT-110 at the same temperature, which is an improvement.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges include each and every value within that range.

What is claimed is:
1. A method for transferring heat comprising:
a. providing a device; and
b. using a heat-transfer fluid to transfer heat to or from the device, wherein the heat-transfer fluid comprises at least one unsaturated fluoroether having the formula CF$_3$(CF$_2$)$_x$CF=CFCF(OR)(CF$_2$)$_y$CF$_3$, wherein x and y are 1, and R is CH$_3$.

2. The method of claim 1, wherein the unsaturated fluoroether has a viscosity of less than 100 centistokes at −31° C.

3. The method of claim 1, wherein the unsaturated fluoroether has a viscosity of less than 20 centistokes at −31° C.

4. An apparatus requiring heat transfer comprising:
a. a device; and
b. a mechanism for transferring heat to or from the device; comprising using a heat transfer fluid, wherein the heat transfer fluid comprises at least one unsaturated fluoroether having the formula $CF_3(CF_2)_xCF\!=\!CFCF(OR)(CF_2)_yCF_3$, wherein x and y are 1, and R is $CH_3$.

5. The apparatus of claim 4, wherein the device is heated.

6. The apparatus of claim 4, wherein the device is cooled.

7. The apparatus of claim 4, wherein the device is maintained at a selected temperature.

8. The apparatus of claim 4, wherein the device is a microprocessor, wafer used to manufacture semiconductor devices, power control semiconductor, electrical distribution switch gear, power transformer, circuit board, multi-chip module, packaged and unpackaged semiconductor device, chemical reactor, nuclear reactor, fuel cell, laser, or missile component.

* * * * *